United States Patent
Van Wijk et al.

[11] Patent Number: 5,885,186
[45] Date of Patent: Mar. 23, 1999

[54] CONTINUOUSLY VARIABLE TRANSMISSION

[75] Inventors: Wilhelmus Johannes Maria Van Wijk, Udenhout; Wilhelmus Cornelus Waltherus Maria Roovers, Prisenbeek; Chi Chung Choi, Eindhoven; Bastiaan Andreas d'Herripon, Tilburg; Emery Frederik Marie Hendriks, Heeze, all of Netherlands

[73] Assignee: Van Doorne's Transmissie B.V., Tilburg, Netherlands

[21] Appl. No.: 716,893

[22] Filed: Sep. 20, 1996

Related U.S. Application Data

[63] Continuation-in-part of Ser. No. 291,538, Aug. 16, 1994, abandoned.

[30] Foreign Application Priority Data

Aug. 17, 1993 [NL] Netherlands .......................... 93 01418

[51] Int. Cl.⁶ .................................................. F16H 59/14
[52] U.S. Cl. ................................ 477/43; 477/45; 477/48; 477/906
[58] Field of Search ................................ 477/43, 45, 46, 477/48, 49, 906; 474/18, 28

[56] References Cited

U.S. PATENT DOCUMENTS

| | | | |
|---|---|---|---|
| 4,598,611 | 7/1986 | Frank | 477/43 X |
| 4,627,311 | 12/1986 | Yokooku et al. | 477/43 X |
| 4,699,025 | 10/1987 | Omitsu | 477/48 X |
| 4,735,112 | 4/1988 | Osanai et al. | . |
| 4,823,267 | 4/1989 | Kumura | . |
| 4,982,822 | 1/1991 | Petzold et al. | 474/28 X |
| 5,079,704 | 1/1992 | Sakai et al. | . |
| 5,086,672 | 2/1992 | Kato et al. | . |
| 5,089,964 | 2/1992 | Morishige et al. | 477/45 X |
| 5,092,198 | 3/1992 | Morishige et al. | 477/46 |
| 5,136,495 | 8/1992 | Tokoro et al. | . |
| 5,144,864 | 9/1992 | Sawasaki et al. | 477/45 X |
| 5,269,726 | 12/1993 | Swanson et al. | 474/28 |
| 5,323,318 | 6/1994 | Hasegawa et al. | . |
| 5,382,205 | 1/1995 | Togai et al. | 477/43 |

FOREIGN PATENT DOCUMENTS

| | | |
|---|---|---|
| 0 498 210 | 8/1992 | European Pat. Off. . |
| 6-81933 | 3/1994 | Japan . |
| WO 93/00533 | 1/1993 | WIPO . |

*Primary Examiner*—Charles A. Marmor
*Assistant Examiner*—Peter T. Kwon
*Attorney, Agent, or Firm*—Young & Thompson

[57] ABSTRACT

The invention relates to a continuously variable transmission. The continuously variable transmission according to the invention is designed such that in operating conditions to be defined in more detail the transmission ratio is kept essentially constant, in particular for travelling through bends, on inclines, in case of an emergency stop and during a transmission overspeeding. The constant transmission ratio is obtained while the input r.p.m. of the transmission is changing.

15 Claims, 5 Drawing Sheets

CONTINUOUSLY VARIABLE TRANSMISSION

This application is a continuation-in-part of application Ser. No. 08/291,538 filed Aug. 16, 1994, abandoned.

The invention relates to a continuously variable transmission, in particular for a motor vehicle, provided with control means for setting the transmission ratio of the transmission, said control means having inputs for signals at least corresponding to the vehicle speed and the transmission ratio and being designed such that on the basis of these signals in certain operating conditions an essentially constant transmission ratio is maintained while the input r.p.m. of the transmission is changing, the transmission comprising a first and second pulley having an endless drive belt therebetween, each pulley having two sheaves, one of which is axially displaceable relative to the other, the control means comprising a hydraulic control system, for adjusting the relative position of each displaceable sheave via a piston-cylinder unit, and a control valve unit having a first control valve for controlling the supply and discharge of medium to at least one piston-cylinder unit, and an electronic control circuit.

BACKGROUND OF THE INVENTION

Such a continuously variable transmission is known from the published International Application WO 93/00533. The known continuously variable transmission, in certain operating conditions, gives driving characteristics which are not optimal and can affect the efficiency and service life of the transmission.

Object of the Invention

The object of the invention is to provide a continuously variable transmission which provides for optimum driving characteristics and improved efficiency.

SUMMARY OF THE INVENTION

To this end, the continuously variable transmission as specified above, is characterized according to the invention such that the electronic control circuit comprises a feedback loop which, in specified operating conditions, is connected to an arithmetic circuit having as inputs the vehicle speed and the current transmission ratio and comprising an engine map memory, in which vehicle speed, constant transmission ratios and desired input r.p.m. are stored, said electronic circuit providing the desired input r.p.m. of the transmission, and which feed back loop on the basis of the desired and measured input r.p.m. sets the first control valve, and that the first control valve coupled to the piston-cylinder unit of the first pulley is designed such that in said specified operating conditions the valve maintains an essentially constant quantity of medium in the piston-cylinder unit.

In the operating conditions to be further defined the transmission ratio remains constant, with the result that the continuously variable transmission gives better driving comfort. Moreover, from that state the transmission can change directly without shocks and under torque if the defined operating conditions no longer correspond to the actual operating conditions. The transmission is thus also subjected to a less heavy load, with the result that the service life increases and the efficiency is also improved, e.g. because, with a partially hydraulic control system, a smaller pump wilt suffice. The control means can be provided with inputs for signals which correspond to the parameters being used to define the operating conditions.

In this case the signals can comprise one or more of the following variables, or derivatives thereof: accelerator position, accelerator speed, vehicle speed, input r.p.m. of the transmission, engine speed, engine torque, braking force, position of the brake pedal, transverse and/or longitudinal accelerations, time derivatives thereof, driver command, steering position and wheel position of the vehicle. When driving through bends, on inclines, and in emergency stop and transmission overspeeding situations, it is thus ensured that from those situations a direct transmission ratio change is possible with sufficient torque and optimum driving comfort. This also prevents slip in the transmission, and the service life of the transmission will increase.

According to a further embodiment of the invention, the continuously variable transmission additionally comprises a second control valve disposed in a hydraulic line between the first control valve and the piston-cylinder unit of the first pulley and operable to shut off said hydraulic line, and an ON/OFF solenoid to control said second control valve at specified other operating conditions.

According to the invention, the above specified operating conditions, at which the first control valve can be set in balanced condition, are travelling in bends and on inclines. Furthermore the specified other operating conditions, at which the ON/OFF solenoid can shut off the hydraulic line, are during an emergency stop and subsequent takeoff, and during transmission overspeeding,

BRIEF DESCRIPTION OF THE DRAWINGS

The invention will be explained with reference to the drawings, in which.

DETAILED DESCRIPTION OF THE INVENTION

Figure 1:
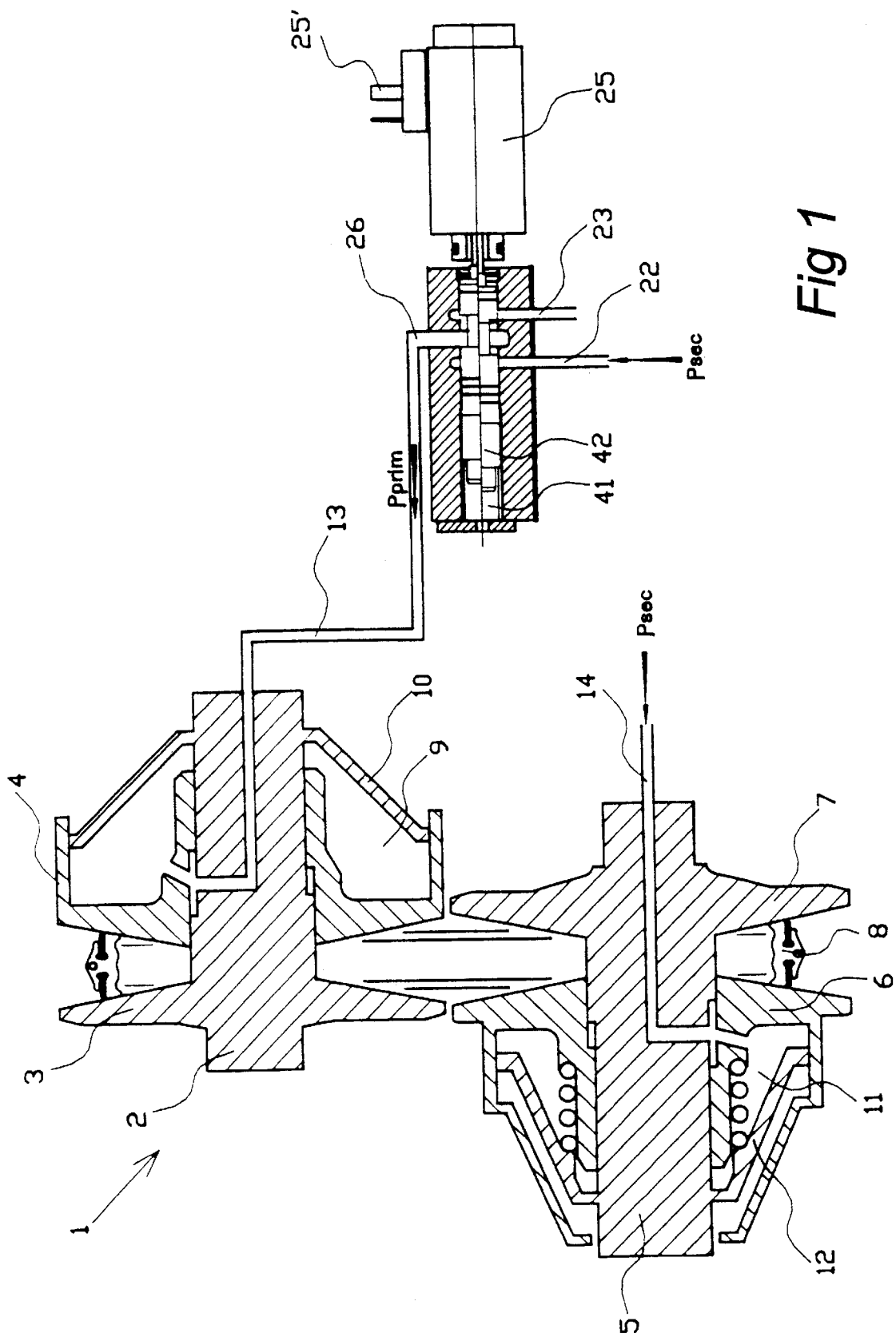
FIG. 1 shows diagrammatically a continuously variable transmission according to the invention, provided with a first control valve.

The continuously variable transmission 1 shown diagrammatically in FIG. 1 comprises a primary pulley fitted on the shaft 2 and having sheaves 3 and 4. The shaft 2 is coupled to, for example, the engine (not shown) of a motor vehicle. A secondary pulley with sheaves 6 and 7 is disposed on a shaft 5. The shaft 5 is coupled to, for example, the wheels of a motor vehicle (not shown). A drive belt 8 is disposed between the sheaves 3, 4 of the primary pulley and the sheaves 6, 7 of the secondary pulley. The transmission ratio of the transmission can be varied by varying the radial position of the drive belt 8 between the sheaves 3, 4 and 6, 7, respectively. For this purpose, the sheaves 4 and 6 are disposed displaceably on the shafts 2 and 5, respectively, and are provided with piston-cylinder units 9, 10 and 11, 12, respectively, which can produce a movement of the displaceable sheaves. The piston-cylinder units 9, 10 and 11, 12 are provided with supply and discharge lines 13, 14, respectively, for the supply and discharge of (hydraulic) medium. A so-called secondary pressure $P_s$ is generally supplied through the line 14, which secondary pressure causes the drive belt to be clamped to a sufficient extent between the pulleys. A so-called primary pressure $P_{prim}$ is then supplied through the line 13, which primary pressure controls the transmission ratio of the transmission. Otherwise, the continuously variable transmission can also be controlled in another way (e.g. by means of an electric motor), and the invention is not restricted to the type of continuously variable transmission shown in FIG. 1.

The way in which the continuously variable transmission shown works is assumed to be known in the description which follows.

The secondary pressure $P_j$, supplied through line 14 for clamping the drive belt 8 between the pulleys, is also supplied to a first control valve 21 through line 22. The first control valve 21 with valve member 24 in this case controls the primary pressure $P_{prim}$ which is being discharged through line 26. With this valve, the quantity of medium in the piston-cylinder unit can be controlled thereby changing the position of sheave 4 and thus changing the transmission ratio. Because the secondary or output r.p.m. of shaft 5 is momentarily fixed (being coupled to the wheels), the primary or input r.p.m. of shaft 2 will change.

The first control valve in this case is electronically controlled by the electronic control unit 25, which can move valve member 24 in the first control valve 21. The electronic control unit 25 is provided with an electrical connection $25^1$ to which signals are fed, depending on a large number of variables representing the operating conditions of the transmission and the vehicle. For this reference is made inter alia, to European Patent Application 91200513.

A large number of parameters, or derivatives thereof, can be used for determining the operating conditions in which the transmission ratio must be kept constant. They include the primary speed of shaft 2, the engine speed and engine torque, the accelerator position, the accelerator speed, the vehicle speed, the braking force, the position of the brake pedal, transverse and/or longitudinal accelerations, time derivatives thereof, a driver command, steering position and wheel position of the vehicle. On the basis of the measured parameters, it can be decided whether an operating condition exists in which the transmission ratio should be kept constant. On the basis thereof, a signal can be given to the first control valve 21 such that the quantity of hydraulic medium in the chamber 9 of the piston-cylinder unit is kept essentially constant.

A constant transmission ratio in the operating conditions to be defined is therefore fully controlled here by the first control valve 21. For that purpose, the valve member 24 controls the connection between line 22 with the secondary pressure $P_j$ and line 26 for the primary pressure $P_{prim}$. On account of the natural leakage from line 26 and the piston-cylinder unit 9, 10, the valve member 24 in this case will be set in a balanced condition, so that, by limited leakage supply from line 22 to line 26 the above-mentioned leakage can be compensated for. That means that the quantity of medium in the piston-cylinder unit is maintained constant by means of the flow from line 22 to line 26. For this purpose, said control valve 21 is specifically designed. In the left position of valve member 24, there is a clear connection between lines 22 and 26, while line 23 is cut off. In the right position of 24, line 22 is cut off and lines 26 and 23 are connected. In the balanced or in between position of 24, there is a slight leakage of medium from line 22 both to line 26 and to line 23.

Figure 2:
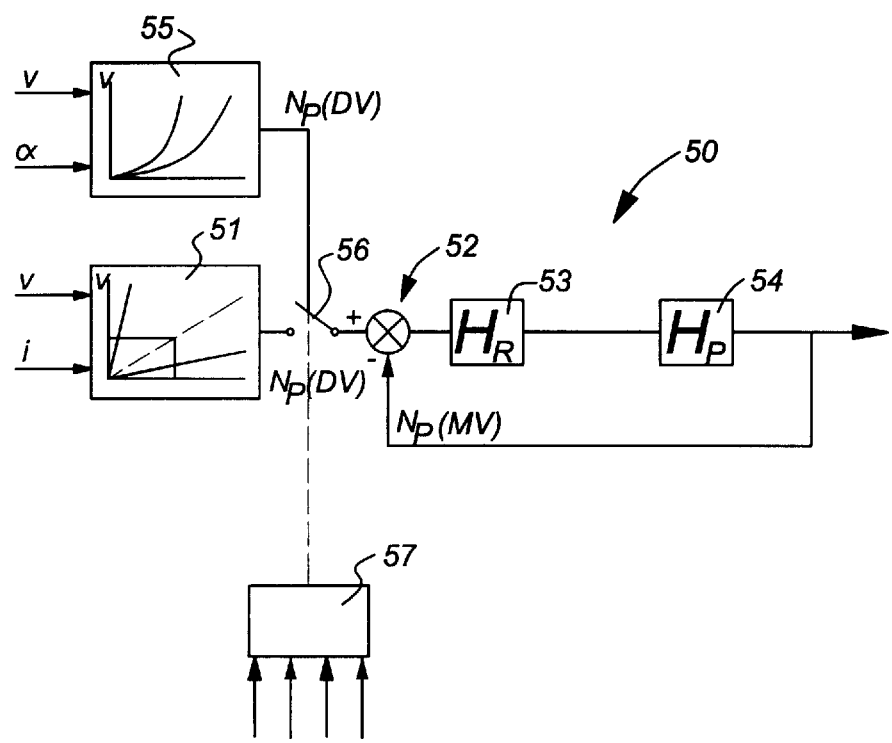
FIG. 2 shows a feedback loop system according to the invention.

In order to control an essentially constant transmission ratio, the transmission 1 is provided with a feedback loop system 50 shown in FIG. 2.

This feedback loop system in normal operation that means when a normal performance or a sporting performance of the motor vehicle is required is connected to an arithmetic or control unit 55. This unit, to the inputs of which the measured vehicle speed V and the position α of the gas pedal are applied, comprises a memory in which data are stored. Said data or engine maps represent the relation between the vehicle speed V (or the directly thereto related value $N_s$ of the r.p.m. of the secondary shaft 5) and the value $N_P$ of the r.p.m. of the primary shaft 2. The curvilinear parabolic relation is diagrammatically shown in block 55. The arithmetic unit 55 will provide at its output a desired value $N_P(DV)$ of the r.p.m. of the primary shaft. The signal $N_P(DV)$, like the measured input r.p.m. $N_P(MV)$, is fed to a difference former 52, the output difference signal of which is fed to a controller 53.

This controller 53 is a PID controller, the parameters of which are dependent on the position in the variogram (see FIG. 3). The output signal of 53 is applied to the control unit 25, 25' (e.g. a proportional solenoid) which adjusts the first control valve 21. The control from the control unit 25 via the first control valve 21 to the transmission (3, 4; 6, 7; 8) results in a certain primary r.p.m. which is measured. This whole process is represented in a transfer function (block) 54.

The resulting measured value of the input r.p.m. $N_P(MV)$ is, as said before, fed to the difference former 52.

In FIG. 2, furthermore a logic unit 57 is indicated, to which signals are inputted which represent above mentioned parameters. On the basis of one or more of said parameters, or derivatives thereof, unit 57 will determine the operating condition in which the transmission ratio must be kept constant. Under control of unit 57 the switch 56 will then be switched from unit 55 onto the arithmetic unit 51. The measured vehicle speed V and the current transmission ratio I are supplied to this arithmetic unit 51. Said unit furthermore comprises a memory in which data are stored. Said data or engine maps represent the relation between the vehicle speed V and the desired value $N_P (DV)$ of the r.p.m. of the primary shaft, that means the ingoing r.p.m. of the transmission. As a result of the operation of said switch 56 and the arithmetic unit 51, the constant transmission ratio of the transmission will be set during above mentioned operating conditions.

The effect of the use of the method and the transmission according to the invention will be discussed below and compared with the prior art, with reference to FIG. 3, for a number of possible operating conditions to be defined, for which the transmission ratio is preferably kept essentially constant. For this purpose, FIG. 3 gives so-called variogram as a function of the vehicle speed V and the input r.p.m. $N_P$ of the transmission. The lines L (low) and OD (overdrive) determine the limits within which the transmission can be regulated. The transmission ratio is constant on a straight line which generally runs through the origin but may also be offset with respect to the origin.

Figure 3A:
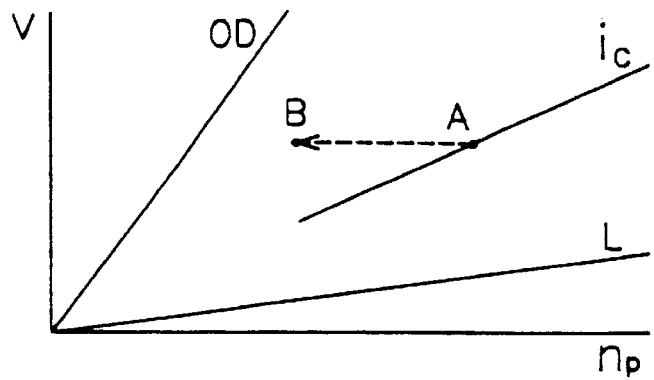
FIG. 3 show (a) a variogram of the transmission during travel in bends, (b) on inclines, (c) in the case of an emergency stop, and (d) during r.p.m. limiting.

FIG. 3a shows travel through bends. If, for example, a bend is being approached at operating point A and the driver eases off the accelerator a little, the transmission according to the prior art will shift to point B. Owing to the mass inertia, this upshift will be experienced by the driver as a push in his back, and no engine-braking effect will be obtained. The prior art consequently does not provide the optimum driving comfort. However, if according to the invention the transmission ratio is kept essentially constant during driving in a bend from A, the transmission will be regulated along the straight line $i_c$. As a result, a change-down push will be avoided and an engine-braking effect is obtained. Moreover, after the bend, torque will be available more quickly at the correct transmission ratio. Suitable parameters for defining the operating condition "bend" include the brake pedal position, the accelerator position, the accelerator speed, transverse and longitudinal accelerations, and the steering and wheel positions.

Figure 3B:
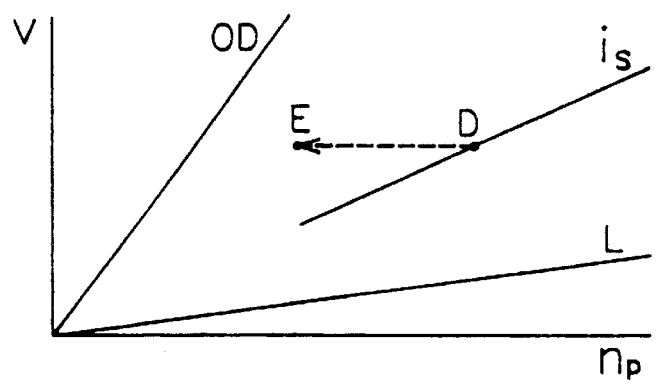

FIG. 3b shows driving down an incline. If, for example, an incline is being driven down from operating point D, the driver will ease off the accelerator a little, in order to reduce speed. According to the prior art, the transmission will change to operating point E. Here again, a push is experienced, and no engine-braking effect occurs. If according to the invention, the transmission ratio is now kept essentially constant along straight line $i_s$ from point D while driving down an incline, an engine-braking effect is indeed obtained, and an inertia push is avoided, Driving down an incline consequently becomes considerably more comfortable. In this case it may also be practical to regulate the output r.p.m. of the transmission. Suitable parameters for defining the operating condition "incline" include the accelerator position, longitudinal accelerations, brake pedal position, gradients, change in centre of gravity and power ratio of front and rear axle of the vehicle.

Figure 4:
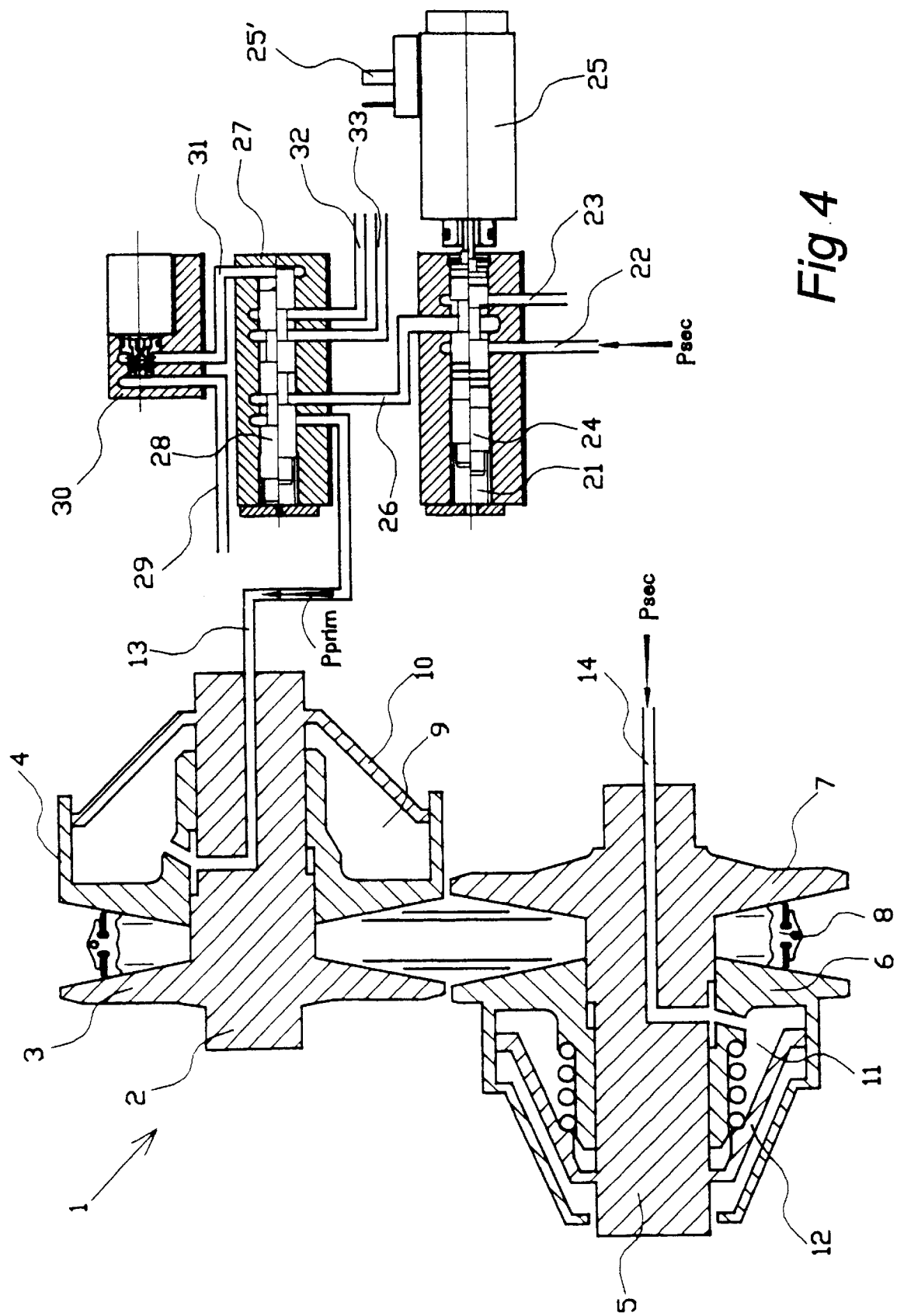
FIG. 4 shows diagrammatically a continuously variable transmission according to the invention, provided with a first and a second control valve.

In FIG. 4 a further embodiment of the invention is shown which under specified other operating conditions, to be explained further, is used for substantially maintaining constant the transmission ratio.

The primary pressure $P_{prim}$ is supplied through line 26, a second control valve 27 and line 13 to the primary pulley with the piston-cylinder unit 9, 10.

Depending on the position of valve 28 in the second control valve 27, the connection between the lines 26 and 13 is opened or shut. In the open position, the first control valve 21 controls the primary pressure $P_{prim}$. In this open position, the control is operative as explained above relative to FIGS. 1 and 2. However, in the dosed position no discharge and supply of (hydraulic) medium can be possible from and to the piston-cylinder unit, and the transmission ratio of the transmission according to the invention is thus kept essentially constant. Keeping the transmission ratio essentially constant has a large number of advantages in other operating conditions to be defined in more detail, such as during emergency stops and at runaway speed of the transmission. These other operating conditions mentioned here specifically will be discussed below in more detail. In this closed position, the transfer function 54 (described earlier with reference to FIG. 2) is not operative until the control is brought back to the open position of the second control valve 27.

The signal fed in this further embodiment to the second control valve 27, in order to open it or not to open it, consists of a hydraulic signal in line 31 and coming from a line 29, a solenoid 30 being placed between the lines 29 and 31. Said solenoid 30 is electronically controlled and is excited or not excited depending on the operating conditions. If the operating conditions are such that the transmission ratio needs to be regulated normally, and need not necessarily be essentially constant, the solenoid 30 will keep the connection between the lines 29 and 31 open, the valve 28 of the first control valve will move to the left, and the lines 26 and 13 for the primary pressure $P_{prim}$ will be in connection with each other. However, if the operating conditions are such that the transmission ratio must be kept constant according to the invention, the solenoid 30 will break the connection between the lines 29 and 31, and the valve 28 of the second control valve 27 will slide to the right, with the result that the connection between the lines 26 and 13 is broken. The primary pressure $P_{prim}$ in line 13, or the flow rate, consequently remains essentially constant, and the transmission ratio will consequently also remain essentially constant.

Since some leakage will generally occur in line 13 and the piston-cylinder unit 9, 10, the solenoid 30 can be provided with a pulse-width modulator (PWM). The result of this is that the second control valve will always be opened briefly, in such a way that the leakage can be compensated for.

The second control valve 27 is also provided with connections for the lines 32 and 33. Une 33 conducts an excitation signal for a reversing mechanism (not shown), At excessive forward speeds of the vehicle and the transmission, for safety reasons and in order to prevent damage to the transmission, the reversing mechanism must not be actuated. The second control valve 27 then is designed in such a way that at forward speeds above a certain value, e.g. 7 km per hour, the connection between lines 32 and 33 is broken. This measures ensures that in the event of incorrect actuation at excessive high speeds, the signal from line 32 will not be passed to line 33 and the reversing mechanism.

Figure 5A:
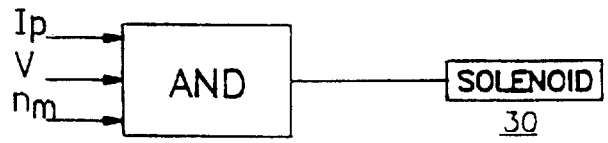
FIG. 5 shows (a) a control unit for the second control valve with state diagram, (b) the same control unit provided with an S/R flipflop with state diagram.

FIG. 5a shows diagrammatically an electronic control system for the solenoid 30. Connected upstream of the solenoid 30 there is an AND gate, to which signals are supplied containing respectively a measure for the vehicle speed V, the engine speed Nm and the excitation signal $1_P$ outputted by the controller 53 in FIG. 2 and also fed to input $25^1$ of the electronic unit 25. According to the state diagram, of which an example is shown, the solenoid will be excited if three conditions are met: the exciting current $1_P$ must be greater than 0, the vehicle speed V must be greater than 7 km per hour, and the engine speed $n_M$ must be lower than 6000 r.p.m. When one or more of three output values $1_P$ V and $n_M$ is equal to or becomes zero, the excitation of the solenoid 30 is cancelled through which the connection between line 26 and line 13 is blocked. This circuit ensures that the transmission ratio is kept constant or will only change gradually at low speeds, at a dangerously high speed, and in case of a cable break.

Figure 5B:
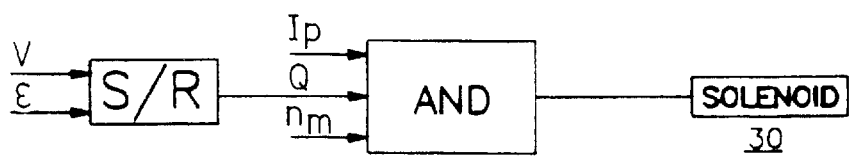

In FIG. 5b, by comparison with the electronic control system for the solenoid 30 shown in FIG. 4a, the signal V as a measure for the vehicle speed is replaced by a signal Q coming from an S/R flipflop. The S/R flipflop in this case sets its output signal Q to zero or one, or maintains the previous state Qc (i.e. zero or one) dependent on the vehicle speed V and $\epsilon$ (e being the difference between the desired $N_P(DV)$ and measured $N_P(MV)$ values of the input r.p.m. of the transmission).

Figure 3C:
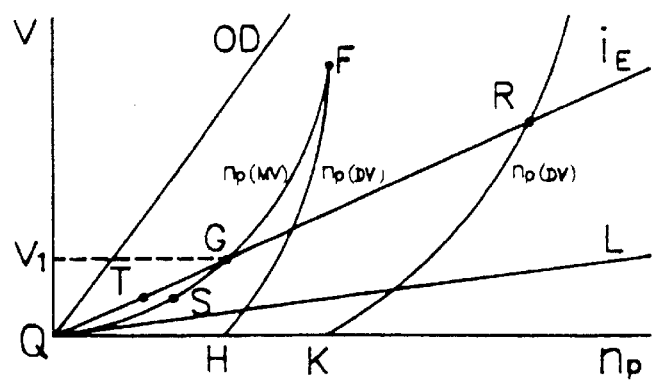

FIG. 3c shows the situation during an emergency stop. If, for example, the driver brakes sharply at point F, the vehicle speed will drop very quickly, in such a way that the control cannot follow the desired line FH for the input r.p.m., and proceeds along the line FG/SO. At point O the clamping tension of the pulleys on the drive belt decreases considerably. After an emergency stop, the vehicle must be able to drive off again quickly. This during off follows the line OKR. However, since the clamping tension of the pulleys on the drive belt has decreased considerably at point O, said tension cannot be built up quickly enough when driving off, with the result that the drive belt may slip, and this may result in considerable wear on and/or damage to the drive belt and pulleys. Moreover, driving off is accompanied by a shock at the moment when the drive belt is placed under sufficient tension. However, according to the invention below a certain vehicle speed $V_1$ the transmission ratio is now kept constant in case of an emergency stop. The transmission ratio in this case is regulated from point G (at $V_1$) along the line GTO, and the drive belt consequently remains under tension even at point O. When the vehicle is driven off again, the drive belt will thus not be able to slip, and damage and wear will be prevented, while no shock will be felt either. When the vehicle is driven off, the transmission is regulated along line OTGR. Not until point R, where the desired input r.p.m. $N_P(DV)$ and the measured r.p.m. $N_P(MV)$ are equal again, is the imposition of the transmission ratio lifted, and the transmission can be freely regulated again. Suitable parameters for defining an operating condition "emergency stop" are the brake pedal and accelerator position, accelerations, measured input r.p.m., and the difference between the measured and the desired Input r.p.m. of the transmission.

Figure 3D:
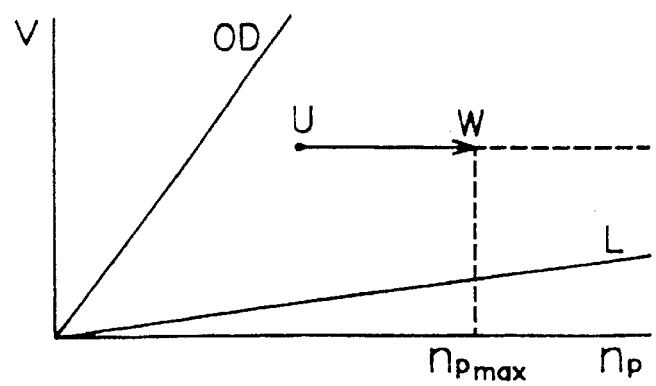

Finally, FIG. 3d shows the situation during r.p,m. limitation. For example, if in operating point U the transmission suddenly begins to speed up uncontrollably (i.e. transmission overspeeding), for example through a fault in the electronic control system, the number of r.p.m. is in danger of exceeding an acceptable r.p.m., which may lead to considerable damage. Although the r.p.m. limitation will to some extent accept a raise in the r.p.m of the transmission, the r.p.m. are limited to a maximum $N_{pmax}$ max at operating point W. Thereby no damage can occur and safety is not at issue. After the start of keeping the transmission ratio essentially constant from point W, the transmission is regulated along line $J_j$. Moreover, the driver can also decide himself to keep the transmission ratio essentially constant by giving an appropriate command by suitable means.

It will be clear that the invention is not restricted to the embodiments shown, but that many embodiments are conceivable within the idea of the invention. For example, the displacement of the sheaves of the pulleys can be by electromechanical instead of by hydraulic means. The invention is also readily applicable to other types of continuously variable transmissions. Instead of the parameters and variables mentioned, derived parameters or related parameters and variables can also be used. For example, the engine speed can be used instead of the input r.p.m. of the transmission.

We claim:

1. A continuously variable transmission, in particular for a motor vehicle, provided with control means for setting the transmission ratio of the transmission, said control means having inputs for signals at least corresponding to the vehicle speed (V) and the transmission ratio (i) and being designed such that on the basis of these signals under certain operating conditions an essentially constant transmission ratio is maintained while input r.p.m. of the transmission is changing, the transmission (1) comprising a first (3, 4) and second (6, 7) pulley having an endless drive belt (8) therebetween, each pulley having two sheaves, one (4, 6) of which is axially displaceable relative to the other (3, 7), the control means comprising a hydraulic control system, for adjusting the relative position of each displaceable sheave via a piston-cylinder unit (9, 10; 11, 12), and a control valve unit having a first control valve (21) for controlling supply and discharge of medium to at least one piston-cylinder unit, and an electronic control circuit, wherein, the electronic control circuit comprises a feedback loop (50) which, under specified operating conditions, is connected to an arithmetic circuit (51) having as inputs the vehicle speed (V) and the current transmission ratio (i) and comprising a memory in which vehicle speed (V), constant transmission ratios (i) and desired input r.p.m. ($N_P(DV)$) are stored, said circuit (51) providing the desired input r.p.m. ($N_P(DV)$) of the transmission (1), and said feedback loop, on the basis of the desired ($N_P(DV)$) and measured ($N_P(MV)$) input r.p.m., setting the first control valve (21), and the first control valve coupled to the piston-cylinder unit (9, 10) of the first pulley being designed such that under said specified operating conditions the first control valve maintains an essentially constant quantity of medium in the piston-cylinder unit, wherein, in the position of the first control valve when constant ratio is controlled, an amount of leakage passing the first control valve into a hydraulic line to the piston-cylinder unit compensates for leakage of said piston-cylinder unit and said line.

2. Continuously variable transmission according to claim 1, wherein the first control valve is set in a balanced condition.

3. Continuously variable transmission according to claim 1, additionally comprising said second control valve (27) disposed in a hydraulic line (13) between the first control valve (21) and the piston-cylinder unit (9, 10) of the first pulley and operable to shut off said hydraulic line, and an ON/OFF solenoid (30) to control said second control valve at specified other operating conditions.

4. Continuously variable transmission according to claim 1, wherein said specified operating conditions, at which the first control valve maintains an essentially constant quantity of medium in the piston-cylinder unit, are travelling in bends and on inclines.

5. Continuously variable transmission according to claim 3, wherein at least one of the second control valve and the ON/OFF solenoid is provided with a pulse-width modulator (PWM).

6. A continuously variable transmission according to claim 1, wherein at least one of accelerator position, accelerator speed, vehicle speed, engine speed, engine torque, transmission input r.p.m., braking force, position of brake pedal, transverse acceleration, longitudinal acceleration, driver command, steering position and wheel position of the vehicle are provided to the control means to determine said operating conditions.

7. A continuously variable transmission, in particular for a motor vehicle, provided with control means for setting the transmission ratio of the transmission, said control means having inputs for signals at least corresponding to the vehicle speed (V) and the transmission ratio (i) and being designed such that on the basis of these signals under certain operating conditions an essentially constant transmission ratio is maintained while input r.p.m. of the transmission is changing, the transmission (1) comprising a first (3, 4) and second (6, 7) pulley having an endless drive belt (8) therebetween, each pulley having two sheaves, one (4, 6) of which is axially displaceable relative to the other (3, 7), the control means comprising a hydraulic control system, for adjusting the relative position of each displaceable sheave via a piston-cylinder unit (9, 10; 11, 12), and a control valve unit having a first control valve (21) for controlling supply and discharge of medium to at least one piston-cylinder unit, and an electronic control circuit, wherein, the electronic control circuit comprises a feedback loop (50) which, under specified operating conditions, is connected to an arithmetic circuit (51) having as inputs the vehicle speed (V) and the current transmission ratio (i) and comprising an engine map memory in which vehicle speed (V), constant transmission ratios (i) and desired input r.p.m. ($N_p(DV)$) are stored, said circuit (51) providing the desired input r.p.m. ($N_p(DV)$) of the transmission (1), and said feedback loop, on the basis of the desired ($N_p(DV)$) and measured ($N_p(MV)$) input r.p.m., setting the first control valve (21), and the first control valve coupled to the piston-cylinder unit (9, 10) of the first pulley being designed such that under said specified operating conditions the first control valve maintains an essentially constant quantity of medium in the piston-cylinder unit, and additionally comprising a second control valve (27) disposed in a hydraulic line (13) between the first control valve (21) and the piston-cylinder unit (9, 10) of the first pulley and operable to shut off said hydraulic line, and an ON/OFF solenoid (30) to control said second control valve under specified other operating conditions, wherein said specified other operating conditions, under which the ON/OFF solenoid shuts off the hydraulic line, are during an emergency stop and transmission overspeeding.

8. A continuously variable transmission, in particular for a motor vehicle, provided with control means for setting the transmission ratio of the transmission, said control means having inputs for signals at least corresponding to the vehicle speed (V) and the transmission ratio (i) and being designed such that on the basis of these signals under certain operating conditions an essentially constant transmission ratio is maintained while input r.p.m. of the transmission is changing, the transmission (1) comprising a first (3, 4) and second (6, 7) pulley having an endless drive belt (8) therebetween, each pulley having two sheaves, one (4, 6) of which is axially displaceable relative to the other (3, 7), the control means comprising a hydraulic control system, for adjusting the relative position of each displaceable sheave via a piston-cylinder unit (9, 10; 11, 12), and a control valve unit having a first control valve (21) for controlling supply and discharge of medium to at least one piston-cylinder unit, and an electronic control circuit wherein, the electronic control circuit comprises a feedback loop (50) which, under specified operating conditions, is connected to an arithmetic circuit (51) having as inputs the vehicle speed (V) and the current transmission ratio (i) and comprising an engine map memory in which vehicle speed (V), constant transmission ratios (i) and desired input r.p.m. ($N_p(DV)$) are stored, said circuit (51) providing the desired input r.p.m. ($N_p(DV)$) of the transmission (1), and said feedback loop, on the basis of the desired ($N_p(DV)$) and measured ($N_p(MV)$) input r.p.m., setting the first control valve (21), and the first control valve coupled to the piston-cylinder unit (9, 10) of the first pulley being designed such that under said specified operating conditions the first control valve maintains an essentially constant quantity of medium in the piston-cylinder unit, and additionally comprising a second control valve (27) disposed in a hydraulic line (13) between the first control valve (21) and the piston-cylinder unit (9, 10) of the first pulley and operable to shut off said hydraulic line, and an ON/OFF solenoid (30) to control said second control valve under specified other operating conditions, wherein at least one of the first and second control valve is in the form of a safety valve, such that if there is a power failure, at least one of the supply and discharge of medium from said at least one of the first and second control valve to the piston-cylinder unit is interrupted and the transmission ratio of the transmission can only gradually change.

9. A continuously variable transmission, in particular for a motor vehicle, provided with control means for setting the transmission ratio of the transmission, said control means having inputs for signals at least corresponding to the vehicle speed (V) and the transmission ratio (i) and being designed such that on the basis of these signals under certain operating conditions an essentially constant transmission ratio is maintained while input r.p.m. of the transmission is changing, the transmission (1) comprising a first (3, 4) and second (6, 7) pulley having an endless drive belt (8) therebetween, each pulley having two sheaves, one (4, 6) of which is axially displaceable relative to the other (3, 7), the control means comprising a hydraulic control system, for adjusting the relative position of each displaceable sheave via a piston-cylinder unit (9, 10; 11, 12), and a control valve unit having a first control valve (21) for controlling supply and discharge of medium to at least one piston-cylinder unit, and an electronic control circuit wherein, the electronic control circuit comprises a feedback loop (50) which, under specified operating conditions, is connected to an arithmetic circuit (51) having as inputs the vehicle speed (V) and the current transmission ratio (i) and comprising an engine map memory in which vehicle speed (V), constant transmission ratios (i) and desired input r.p.m. ($N_p(DV)$) are stored, said circuit (51) providing the desired input r.p.m. ($N_p(DV)$) of the transmission (1), and said feedback loop, on the basis of the desired ($N_p(DV)$) and measured ($N_p(MV)$) input r.p.m., setting the first control valve (21), and the first control valve coupled to the piston-cylinder unit (9, 10) of the first pulley being designed such that under said specified operating conditions the first control valve maintains an essentially constant quantity of medium in the piston-cylinder unit, and additionally comprising a second control valve (27) disposed in a hydraulic line (13) between the first control valve (21) and the piston-cylinder unit (9, 10) of the first pulley and operable to shut off said hydraulic line, and an ON/OFF solenoid (30) to control said second control valve under specified other operating conditions, wherein at least one of the first and the second control valve is designed as a reversing block, so that at forward vehicle speeds above a predetermined value any control signal for activation of a reversing mechanism is blocked.

10. Continuously variable transmission according to claim 9, wherein a control signal for activation of a reverse mechanism can be conveyed through the second control valve, and in that the second control valve is provided with an input for a signal corresponding to the vehicle speed.

11. A continuously variable transmission, in particular for a motor vehicle, provided with control means for setting the transmission ratio of the transmission, said control means having inputs for signals at least corresponding to the vehicle speed (V) and the transmission ratio (i) and being designed such that on the basis of these signals under certain operating conditions an essentially constant transmission ratio is maintained while input r.p.m. of the transmission is changing, the transmission (1) comprising a first (3, 4) and second (6, 7) pulley having an endless drive belt (8) therebetween, each pulley having two sheaves, one (4, 6) of which is axially displaceable relative to the other (3, 7), the control means comprising a hydraulic control system, for adjusting the relative position of each displaceable sheave via a piston-cylinder unit (9, 10; 11, 12), and a control valve unit having a first control valve (21) for controlling supply and discharge of medium to at least one piston-cylinder unit, and an electronic control circuit wherein, the electronic control circuit comprises a feedback loop (50) which, under specified operating conditions, is connected to an arithmetic circuit (51) having as inputs the vehicle speed (V) and the current transmission ratio (i) and comprising an engine map memory in which vehicle speed (V), constant transmission ratios (i) and desired input r.p.m. ($N_p$(DV)) are stored, and circuit (51) providing the desired input r.p.m. ($N_p$(DV)) of the transmission (1), and said feedback loop, on the basis of the desired ($N_p$(DV)) and measured ($N_p$(MV)) input r.p.m., setting the first control valve (21), and the first control valve coupled to the piston-cylinder unit (9, 10) of the first pulley being designed such that under said specified operating conditions the first control valve maintains an essentially constant quantity of medium in the piston-cylinder unit, and additionally comprising a second control valve (27) disposed in a hydraulic line (13) between the first control valve (21) and the piston-cylinder unit (9, 10) of the first pulley and operable to shut off said hydraulic line, and an ON/OFF solenoid (30) to control said second control valve under specified other operating conditions, wherein at least one of the first and the second control valve is designed as a speed limiter, such that in case of input r.p.m. of the transmission above a set value the supply and discharge of medium from the first control valve to the piston-cylinder unit is interrupted and the transmission ratio of the transmission can change only gradually.

12. A continuously variable transmission, in particular for a motor vehicle, provided with control means for setting the transmission ratio of the transmission, said control means having inputs for signals at least corresponding to the vehicle speed (V) and the transmission ratio (i) and being designed such that on the basis of these signals under certain operating conditions an essentially constant transmission ratio is maintained while input r.p.m. of the transmission is changing, the transmission (1) comprising a first (3, 4) and second (6, 7) pulley having an endless drive belt (8) therebetween, each pulley having two sheaves, one (4, 6) of which is axially displaceable relative to the other (3, 7), the control means comprising a hydraulic control system, for adjusting the relative position of each displaceable sheave via a piston-cylinder unit (9, 10; 11, 12), and a control valve unit having a first control valve (21) for controlling supply and discharge of medium to at least one piston-cylinder unit, and an electronic control circuit wherein, the electronic control circuit comprises a feedback loop (50) which, under specified operating conditions, is connected to an arithmetic circuit (51) having as inputs the vehicle speed (V) and the current transmission ratio (i) and comprising an engine map memory in which vehicle speed (V), constant transmission ratios (i) and desired input r.p.m. ($N_p$(DV)) are stored, said circuit (51) providing the desired input r.p.m. ($N_p$(DV)) of the transmission (1), and said feedback loop, on the basis of the desired ($N_p$(DV)) and measured ($N_p$(MV)) input r.p.m., setting the first control valve (21), and the first control valve coupled to the piston-cylinder unit (9, 10) of the first pulley being designed such that under said specified operating conditions the first control valve maintains an essentially constant quantity of medium in the piston-cylinder unit, and additionally comprising a second control valve (27) disposed in a hydraulic line (13) between the first control valve (21) and the piston-cylinder unit (9, 10) of the first pulley and operable to shut off said hydraulic line, and an ON/OFF solenoid (30) to control said second control valve under specified other operating conditions, wherein at least one of an exciting signal ($I_p$) for the first control valve, the vehicle speed (V), the engine r.p.m. ($n_M$) and derivatives of the exciting signal, the vehicle speed, and the engine r.p.m., are fed to an AND gate connected before the ON/OFF solenoid, and are compared with corresponding values to be set.

13. Continuously variable transmission according to claim 12, wherein a signal is fed to the solenoid from a set/reset flipflop, the flipflop being provided with inputs for a measure for the vehicle speed (V) and a difference ε between the desired and the measured input r.p.m. of the transmission.

14. Continuously variable transmission according to claim 13, wherein the transmission is designed such that if the difference between the desired and the measured value of the input r.p.m. of the transmission exceeds a predetermined value and the vehicle speed falls below a predetermined value, the transmission ratio is kept essentially constant.

15. Continuously variable transmission according to claim 14, wherein if at a constant transmission ratio after an emergency stop the desired value and the measured value of the input r.p.m. of the transmission are approximately equal again, the transmission ratio becomes variable.

* * * * *